United States Patent
Coulton (10) Patent No.: US 10,668,409 B2
(45) Date of Patent: Jun. 2, 2020

(54) WATER TREATMENT APPARATUS AND METHOD

(71) Applicant: Siltbuster Limited, Monmouth (GB)

(72) Inventor: Richard Henry Coulton, Hereford (GB)

(73) Assignee: Siltbuster Limited, Monmouth (GB)

(*) Notice: Subject to any disclaimer, the term of this patent is extended or adjusted under 35 U.S.C. 154(b) by 173 days.

(21) Appl. No.: 15/526,801

(22) PCT Filed: Feb. 27, 2017

(86) PCT No.: PCT/GB2017/050515
§ 371 (c)(1),
(2) Date: May 15, 2017

(87) PCT Pub. No.: WO2017/149278
PCT Pub. Date: Sep. 8, 2017

(65) Prior Publication Data
US 2018/0065064 A1 Mar. 8, 2018

(30) Foreign Application Priority Data
Feb. 29, 2016 (GB) .................................. 1603497.7

(51) Int. Cl.
*B01D 21/00* (2006.01)
*B01D 21/30* (2006.01)
(Continued)

(52) U.S. Cl.
CPC ....... *B01D 21/0045* (2013.01); *B01D 21/305* (2013.01); *C02F 1/004* (2013.01);
(Continued)

(58) Field of Classification Search
None
See application file for complete search history.

(56) References Cited

U.S. PATENT DOCUMENTS 3,397,789 A * 8/1968 Valdespino ............... C02F 3/12
210/201
6,159,380 A 12/2000 Russell et al.
(Continued)

FOREIGN PATENT DOCUMENTS

GB 2493666 A 2/2013
GB 2520746 A 6/2015
(Continued)

OTHER PUBLICATIONS

International Searching Authority, "International Search Report for PCT/GB2017/050515 dated May 30, 2017", "Foreign Counterpart to U.S. Appl. No. 15/526,801", filed May 30, 2017, pp. 1-5, Published in: WO.
(Continued)

*Primary Examiner* — Bradley R Spies (57) ABSTRACT

A mobile water treatment plant includes a container (10) having: a plurality of tanks, including a clarifying tank fitted with a multiplicity of inclined plates defining a multiplicity of channels there between, an upstream tank from which water is arranged to be fed to the clarifying tank and a downstream tank to which water is arranged to be fed from the clarifying tank; means for introducing a neutralizing agent into water in the upstream tank; at least one storage space within the interior space of the container for accommodating the neutralizing agent. The container is of generally cuboidal shape having a length greater than its width and having sides, ends, a top and a bottom and has corner fittings positioned to enable standard equipment for handling freight containers to engage the container and the overall width of the container is substantially the same as the width of a standard freight container.

21 Claims, 4 Drawing Sheets

(51) Int. Cl.
*C02F 1/00* (2006.01)
*C02F 1/66* (2006.01)
*C02F 1/52* (2006.01)
*C02F 103/34* (2006.01)

(52) U.S. Cl.
CPC ............ *C02F 1/66* (2013.01); *B01D 2221/08* (2013.01); *C02F 1/52* (2013.01); *C02F 2103/34* (2013.01); *C02F 2201/007* (2013.01); *C02F 2201/008* (2013.01); *C02F 2209/06* (2013.01); *C02F 2301/08* (2013.01)

(56) References Cited

U.S. PATENT DOCUMENTS

| | | | |
|---|---|---|---|
| 6,884,347 B1* | 4/2005 | Krieger | C02F 1/24 210/201 |
| 2004/0079691 A1* | 4/2004 | Jowett | C02F 3/04 210/220 |
| 2013/0068698 A1* | 3/2013 | Eddy | B01D 21/0045 210/723 |

FOREIGN PATENT DOCUMENTS

| | | |
|---|---|---|
| WO | 2010040999 A2 | 4/2010 |
| WO | 2011113110 A1 | 9/2011 |
| WO | 2013124639 A1 | 8/2013 |

OTHER PUBLICATIONS

Intellectual Property Office of Great Britian, "Search Report under Section 17 for Application No. GB1603497.7", "Foreign Counterpart to U.S. Appl. No. 15/526,801", dated Jun. 30, 2016, p. 1 Published in: GB.

International Bureau, "International Preliminary Report on Patentability from PCT Application No. PCT/GB2017/050515 dated Sep. 4, 2018", from Foreign Counterpart to U.S. Appl. No. 15/526,801, pp. 1-7, Published: WO.

International Searching Authority, "Written Opinion from PCT Application No. PCT/GB2017/050515 dated May 30, 2017", from Foreign Counterpart to U.S. Appl. No. 15/526,801, pp. 1-6, Published: WO.

European Patent Office, "Communication Pursuant to Article 94(3) EPC, EP Application No. 17708573.5" Foreign Counterpart to U.S. Appl. No. 15/526,801, dated Jul. 5, 2019, pp. 1-5. Published: EP.

\* cited by examiner

WATER TREATMENT APPARATUS AND METHOD

This application claims priority to International Patent Application No. PCT/GB2017/050515 filed on Feb. 27, 2017, which claims priority to GB Patent Application No. 1603497.7 filed on Feb. 29, 2016.

This invention relates to a water treatment apparatus and to a method of treating water using such an apparatus. The water treated may be waste water from an industrial process. Such water may be generated by a variety of industrial processes and the present invention may therefore have a wide variety of applications. The invention is particularly, but not exclusively, concerned with treatment of alkaline waste water generated in the construction industry where, in particular concrete batching plants, hydrodemolition and also other processes or devices generate alkaline waste water.

A conventional approach to treating such waste water is to set up a plant at a central location and transport water to be treated to the plant. At the plant water is fed to first one tank and then another and various treatments carried out on the water; in some tanks chemicals are added to treat the water; for example, acid may be added to reduce the pH. US2007/170119 describes an arrangement of this kind and describes a form of container and vehicle that may be used to transport the water to the treatment plant.

An alternative approach is to treat the waste water locally at the site at which it is generated. That avoids the need to transport the water from one site to another in order to treat it. The apparatus must in this case be reasonably compact in order that it can be transported to the site where it is to be used. The apparatus required usually comprises a plurality of tanks in which different water treatments can be performed, chemicals for treating the water, pumps and control units and pipes for transferring water into or out of the tanks. This makes for a number of separate components that need to be transported to a construction site and which then need to be kept available for use. Construction sites are often not well ordered environments and it is easy for parts of equipment to go missing or not be transported to the site in the first place.

In WO 2010/040999 an apparatus is described in which the disadvantage of having multiple tanks is addressed by providing three tanks in a single unit; that reduces the number of component parts, although there are still separate chemicals, pumps, control units and pipes to be transported and kept available for use; also the multiple tank unit is itself more challenging to transport than if three separate tank units were provided.

It is an object of the invention to provide a water treatment apparatus that overcomes or mitigates one or more of the problems defined above.

According to the invention there is provided a mobile water treatment plant comprising a container within which at least the following are provided: a plurality of tanks, the plurality of tanks comprising a clarifying tank fitted with a multiplicity of inclined plates defining a multiplicity of channels there between, an upstream tank from which water is arranged to be fed to the clarifying tank and a downstream tank to which water is arranged to be fed from the clarifying tank; means for introducing a neutralising agent into water in the upstream tank; at least one storage space within the interior space of the container, said at least one storage space including space for accommodating the neutralising agent, wherein the container is of generally cuboidal shape having a length greater than its width and having sides, ends, a top and a bottom and has corner fittings placed at positions to allow the container to be engaged by standard load handling equipment for handling freight containers and the overall width of the container is substantially the same as the width of a standard freight container.

By providing a mobile water treatment plant in the form of a container that is able to be transported and handled in the same manner as a standard freight container, transport of even a relatively large container is facilitated. By providing both three separate tanks and storage space in the container, it becomes possible for all the equipment that is required for the unit to operate to be contained within the single container, so that the risk of equipment becoming misplaced can be much reduced.

The centre to centre spacing of corner fittings on opposite sides of the container may be about 2260 mm. The spacing set by ISO standards is 2259 mm. The corner fittings may be castings. They may be in accordance with ISO or other standards. It is within the scope of the invention for there to be four corner fittings at the top of the container and none at the bottom, enabling the container to be lifted and handled by standard handling equipment for handling freight containers; similarly, it is within the scope of the invention for there to be four corner fittings at the bottom of the container and none at the top, enabling the container to be transported on a vehicle suitable for transporting standard freight containers; it is, however, preferred that there is a corner fitting at each of the eight corners of the container.

The standard width of an ISO standard freight container is 2438 mm. Sometimes the freight container is of slightly increased overall width but usually not more than 2500 mm. The container may therefore have an overall width of not more than 2500 mm.

Standard freight containers are of various lengths; ISO standard lengths are "10 ft" (2291 mm), "20 ft" (6058 mm), "30 ft" (9125 mm), "40 ft" (12192 mm) and "45 ft" (13716 mm). The container of the invention may be of any of these lengths according to the application for which it is most suited; we have found that for applications for treating alkaline water in the construction industry a length of "20 ft" (6058 mm) is advantageous. The container may therefore have an overall length of about 6 m.

The tanks may be arranged along the length of the container and may be spaced from a first side of the container. The tanks may be adjacent to the second side of the container. A first storage space may adjoin the first side of the container. Whilst this is referred to as a "first" storage space and in an embodiment of the invention described below it is not the only storage space, it is within the scope of the invention for it to be the only storage space.

The tanks may be arranged in a row along the length of the container. Adjacent tanks may share a common wall. Such an arrangement is simple and economical to manufacture and avoids wastage of space. The tanks may therefore be compartments defined within the container.

In use, water may pass out of the upstream tank in an upper region of the tank; for example, it may pass over a weir at the top of the upstream tank. The water may pass from the upstream tank down through a channel, which may be vertical, and enter the bottom of the clarifying tank. Water may pass out of the clarifying tank in an upper region of the tank and into the downstream tank. The water may enter the downstream tank at the top.

A walkway may be defined along the top of the container above the first storage space. The walkway may give a user access to the tops of the tanks. The walkway may extend along a first part of the length of the container and steps leading from the bottom of the container to the walkway may extend along a second part of the length of the container. The first part of the length may be a major part and the second part of the length may be a minor part. The first and second parts of the length may in combination be substantially the whole length of the container. The steps may be bounded on one side by an exterior side wall of the container and bounded on the other side by an internal longitudinal wall of the container; the internal longitudinal wall may also define a wall of one or more tanks.

The walkway may incorporate one or more ducts for cables and/or pipes extending between one or more of the tanks and said at least one storage space.

The first storage space may be divided into two or more storage spaces arranged in a row along the length of the container; adjacent spaces may share a common wall. In an embodiment of the invention described below, the first storage space is divided into two storage compartments arranged alongside one another.

The sides of the container may be substantially closed but one or more doors may be provided in at least one side to provide access to a storage space. In an embodiment of the invention described below, two pairs of doors are provided in one side of the container to provide access to the two storage compartments.

A storage space may be provided at one end of the container. The end storage space may be for accommodating one or more cylinders of gas. The gas may be carbon dioxide for adding to alkaline water to reduce its pH. The end storage space may be an open recess and outside an exterior wall of the container, but within a cuboidal envelope defined by the corners of the container.

Said at least one storage space may comprise one or more fittings for receiving and securing cylinders of carbon dioxide. Said at least one storage space may also be used for housing a store of chemical to be added to the water to be treated.

The plant may further comprise, in said at least one storage space, at least one pump and at least one control unit that includes control means for controlling operation of the pump. The pump may pump a chemical from said at least one storage space into one or more of the tanks.

The plant may further comprise, in said at least one storage space, a control unit. The control unit may control operation of the pump and any mixers and dosing equipment that may be provided. The plant may further include one or more pH sensors in the tanks. The control unit may be arranged to receive one or more inputs from said one or more pH sensors.

The top of the container may comprise a closure member that is movable between a closed and an open position, at least some of the tanks being accessible from above when the closure member is in an open position. A plurality of closure members may be provided. All of the tanks may be open-topped tanks that are closable by the closure member. The closure member may comprise a hinged lid. The lid may be pivotally mounted for pivoting about an axis adjacent to the top of one side of the container.

The container may comprise walls that are thermally insulated. The thermally insulated walls may comprise side and end walls, a bottom and a top. The top wall may be formed principally or entirely by the closure member. The thermally insulated walls may be double skinned walls and thermal insulating material may be provided between the skins. It should be understood that the double skinned walls may take various forms; for example, one skin may be in the form of a structural wall, while the other skin serves merely to retain the insulation in position.

A mixer may be provided in the upstream tank for mixing the contents of the tank. In a case where the neutralising agent is a gas, a gas introduction device may be provided in the upstream tank for introducing gas into the upstream tank. The device may be arranged to introduce gas into a lower region of the upstream tank, preferably at a multiplicity of locations extending across at least part of the tank. By introducing the gas at a multiplicity of locations, a better mixing of the gas with the water can be obtained. The introduction at a multiplicity of locations may for example be achieved by providing a hollow member into which gas is fed and which has a multiplicity of openings across its surface. Alternatively the gas may be dispersed by means of a sparge plate. Similarly a mixer and/or a gas introduction device may be provided in the downstream tank. The gas introduction device in the downstream tank may be arranged in substantially the same way as the gas introduction device in the upstream tank. In a case where the neutralising agent is a liquid, a liquid inlet may be provided in the upstream tank at an appropriate level in the tank.

Similarly a mixer and/or a gas or liquid introduction device may be provided in the downstream tank. The gas or liquid introduction device in the downstream tank may be arranged in substantially the same way as the gas or liquid introduction device in the upstream tank.

A further upstream tank may be provided in the container. Water from the further upstream tank may be arranged to be fed to the first-mentioned upstream tank. Water may pass out of the further upstream tank in an upper region and into the first-mentioned upstream tank. A mixer and/or a gas or liquid introduction device may be provided in the further upstream tank. The gas or liquid introduction device in the further upstream tank may be arranged in substantially the same way as the gas or liquid introduction device in the upstream tank or the downstream tank. By providing two upstream tanks an especially versatile plant can be provided.

An outlet for discharging treated water may be provided in a lower region of the container, the outlet being connected to receive water from an upper region of the downstream tank. The outlet may be provided in an end wall of the container.

An inlet for receiving water to be treated may be provided in a wall of the container, preferably in a lower region of the container. The inlet may be toward the opposite end, or at the opposite end, of the container from the outlet.

The container may be manufactured by modifying a standard freight container. Standard freight containers are made in very large numbers and can therefore be obtained economically. A standard container may be modified by forming openings in its side and end walls, forming additional walls in the container and adding various fittings. Alternatively, the container may be fabricated from basic parts in a similar manner to a standard freight container.

It is an advantage of the present invention that the entire plant that is used to treat the water is entirely self-contained within the cuboidal space defined by the corner castings. It is, however, within the broadest scope of the invention for the plant to be used in conjunction with another piece of equipment that is external to the container. For example, there may be an external electricity supply to which the plant is connected, or there may be another piece of apparatus through which the water flows before or after passing through the container.

According to the invention, there is provided a method of treating water, the method comprising the following steps:

a) providing a mobile water treatment plant as defined above;

b) transporting the plant to a site at which water is to be treated, with at least some of the fastening elements of the container being engaged by load handling equipment and/or a vehicle during the transport;

c) feeding water to be treated to the upstream tank;

d) supplying a neutralising agent to the upstream tank; and e) discharging treated water from the downstream tank.

When treating alkaline water, a neutralising agent may be supplied to both the upstream tank and the downstream tank. The neutralising agent may be a gas, for example carbon dioxide, or it may be a liquid, for example an acid. In the upstream tank the reduction in pH causes solids to be precipitated. Those solids may then be separated in the clarifying tank. The pH may be reduced in the upstream tank to the range of 9.5 to 11.5. By keeping the water alkaline at this stage, the precipitation of solids, principally of calcium carbonate, is promoted. The pH of the water may be further reduced in the downstream tank, after separation of the solids, to the range of 6 to 8; the water may then be suitable for discharge.

Where reference is made in this specification to carbon dioxide, it should be understood that the gas referred to will contain a substantial amount of carbon dioxide, but may also have other components. Preferably at least 90 percent by volume of the gas would be carbon dioxide.

According to the invention there is provided a method of manufacturing a mobile water treatment plant, the method comprising the steps of:

a) providing a freight container with closed sides and ends;

b) cutting openings in the freight container, adding internal walls to the container and adding other fittings to the container to provide a mobile water treatment plant as defined above.

Certain features of the invention have been described above only with reference to the plant of the invention whilst other features have been described only with reference to one of the methods of the invention. It should be understood that a feature described in respect of the plant may be represented also in a feature of one of the methods and vice versa.

By way of example, a mobile water treatment plant and method for treating alkaline water will now be described with reference to the accompanying drawings of which.

Referring to the drawings, there is shown a mobile water treatment plant in the form of a container 10. The container 10 is of the overall dimensions of an ISO standard freight container, in particular in this example, a container of overall length "20 ft" (6058 mm). The container 10 has an overall width of "8 ft" (2438 mm). The container 10 is of a generally cuboidal shape, having opposite sides 12, opposite ends 14, a top 16, a bottom 18 and corner castings 20 at each of its eight corners. Much of the structural strength of the container is provided by beams that extend along all the edges of the container between the castings 20.

The container 10 has an internal longitudinal wall 24 that extends from one end to the other and divides the container into two sections, one wider than the other. The wider section is further divided by transverse vertical walls 26, 28 and 30 into four open-topped compartments 32, 34, 36 and 38 arranged in a row along the length of the container. The narrower section has a closed top 40 extending from one end of the container 10 along a major part of the length of the container 10 and defines an enclosed storage space under the top 40, the enclosed storage space itself being divided by an internal vertical partition (not visible in the drawings) midway along its length to form a pair of storage spaces, which are accessible from the side of the container 10 through respective double doors 42. At the end of the top 40 that terminates partway along the length of the container, a vertical transverse wall 44 is provided. Between the transverse wall 44, the adjacent side 12 and the adjacent end 14 of the container 10, an open-topped recess, accessible from the end of the container is defined and steps 50 are fixed to provide access to a user from the ground to the top 40 which defines a walkway along the top of the container 10.

The exterior walls of the container, the bottom and the lid 52 are all formed as double skinned walls with thermal insulation between them. One skin of the wall acts as the structural wall and the other skin is provided to retain the thermally insulating material.

Figure 1:
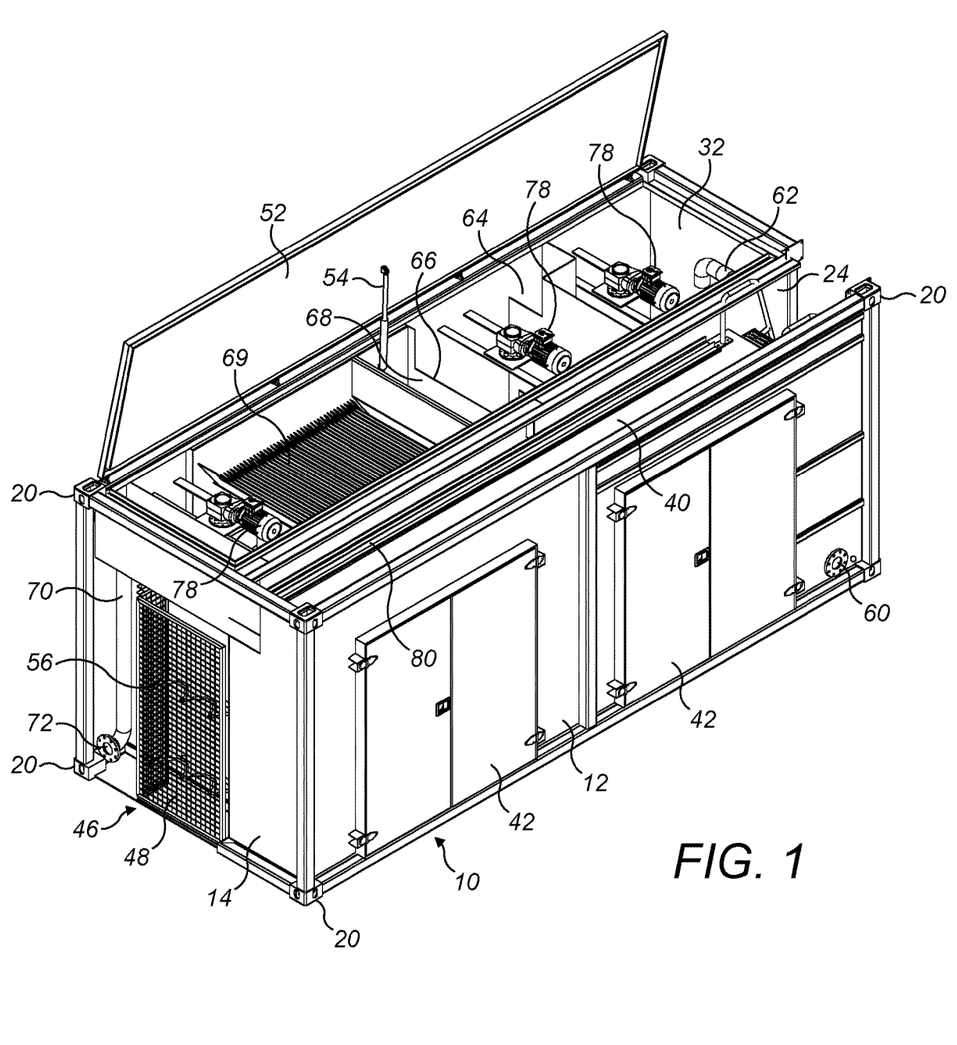
FIG. 1 is an isometric view of the mobile water treatment plant.
Figure 3:
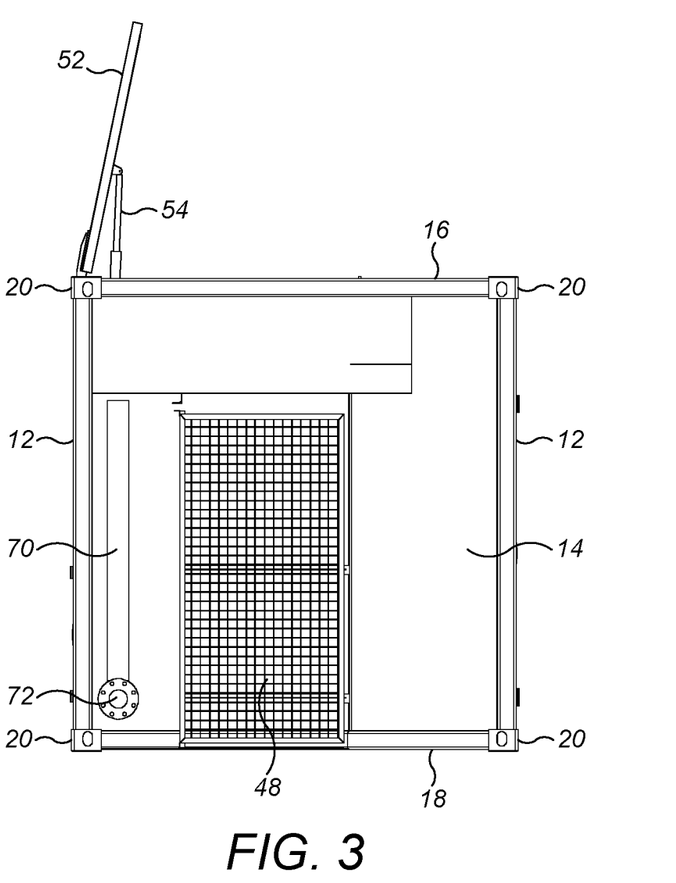
FIG. 3 is an end elevation view of the plant.
Figure 4:
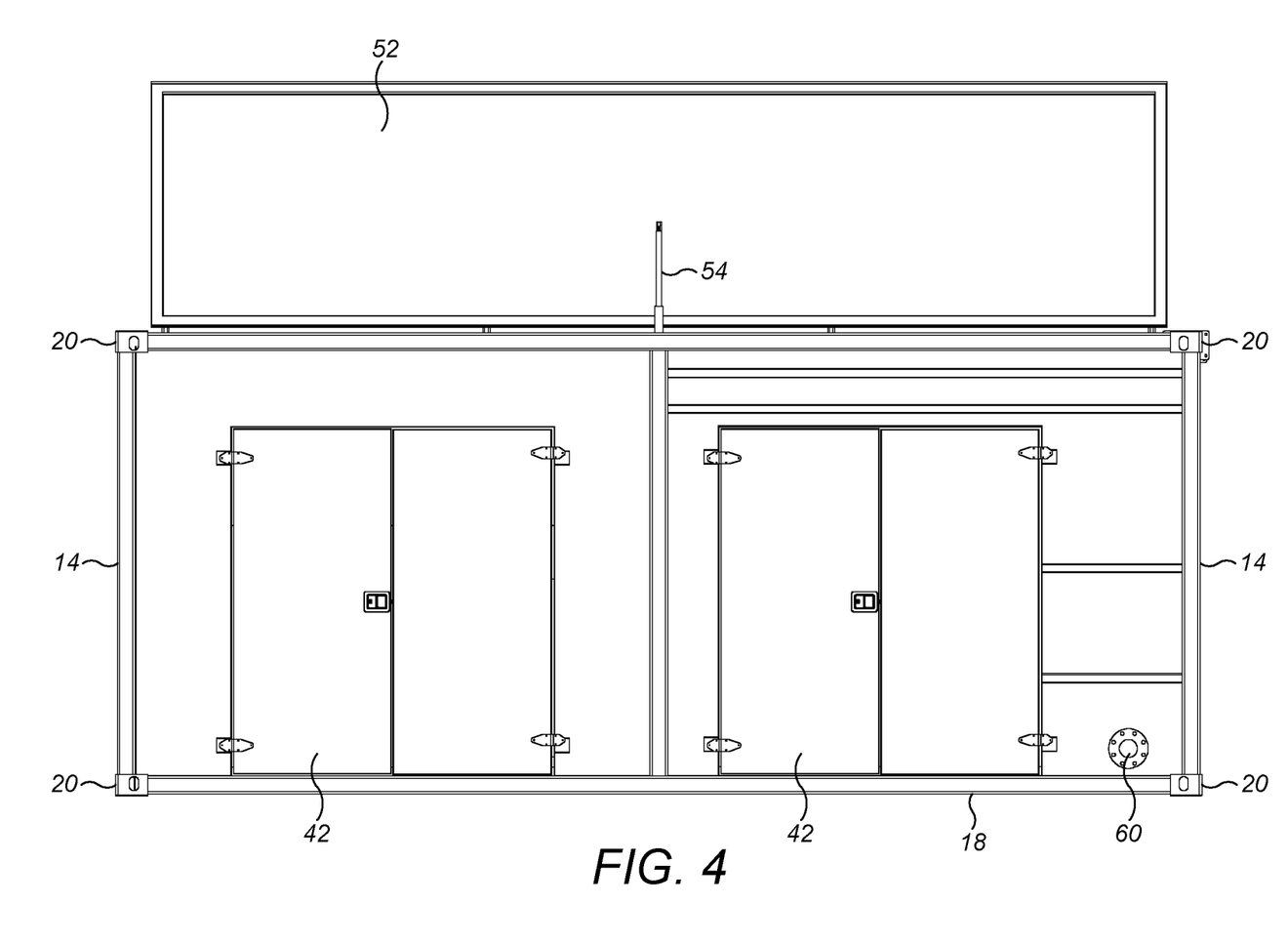
FIG. 4 is a side elevation view of the plant.

The bottom 18, sides 12 and ends 14 of the container 10 are generally closed. At one end 14 an end wall is formed with a shallow recess across almost its entire width and a deeper recess 46 on its exterior, the recess being covered by an openable cage 48. The recess provides a storage space for receiving a pair of cylinders of carbon dioxide and fittings 56 are provided within the recess for holding the cylinders. A lid 52 is provided for closing over the compartments 32, 34, 36 and 38. The lid 52 is hinged about an axis at the side of the container 10 and has a stay 54 which serves both to hold it in the open position shown in the drawings and to reduce the force required to raise it from its closed position.

Figure 2:
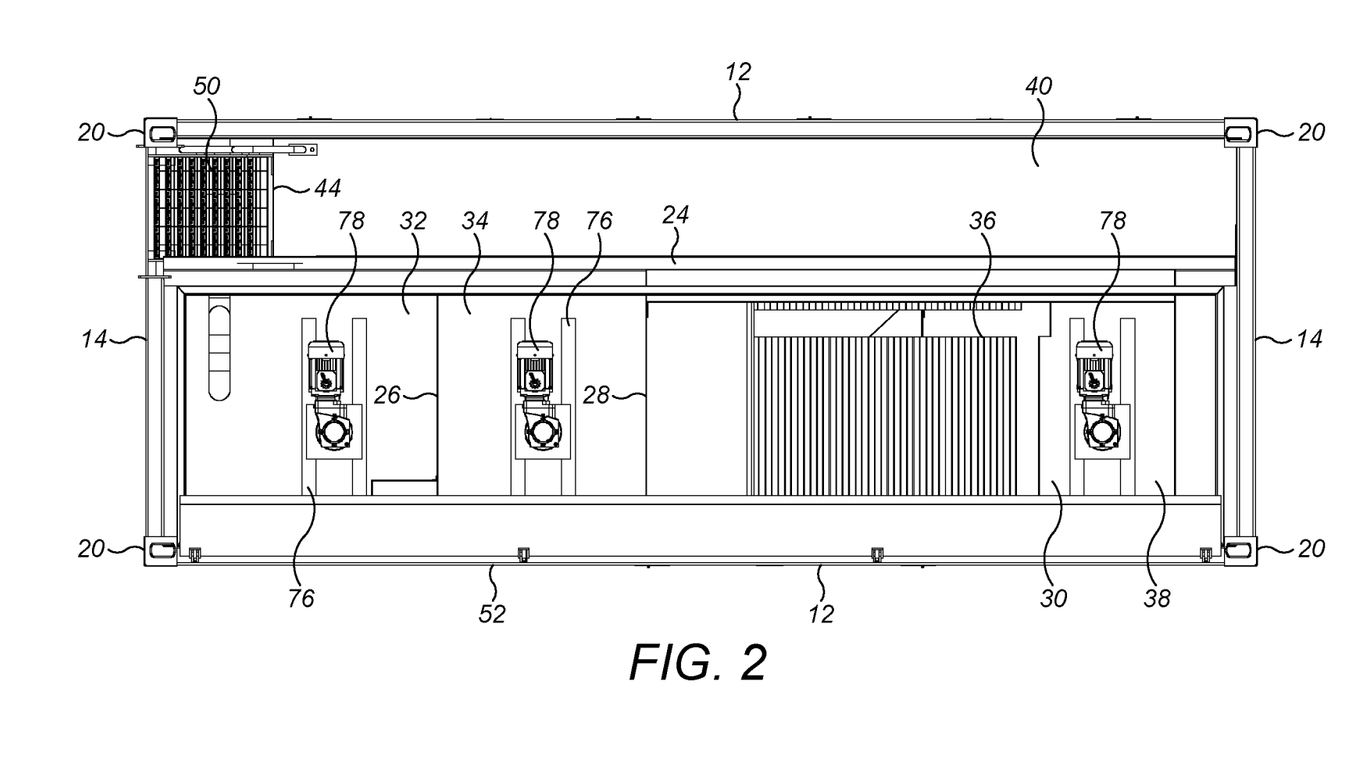
FIG. 2 is a plan elevation view of the plant.

The plant has a water inlet 60 at the bottom of an end region of one of the sides 12 and a pipe (not visible in the drawings) extends from the inlet 60 to an outlet end 62 at the top of the compartment 32. The wall 26 which divides the compartment 32 from the compartment 34 extends upwardly almost to the top of the sides of the container but has a cut-away portion 64 defining an outlet from the compartment 32 and an inlet to the compartment 34. Similarly the wall 28 which divides the compartment 34 from the compartment 36 extends upwardly almost to the top of the sides of the container but has a cut-away portion 66 defining an outlet from the compartment 34 and an inlet to the compartment 36. It may be noted that the bottom of the cut-away portion 66 is at a lower level than the bottom of the cut-away portion 64.

The wall 28 defines one side of a channel 68 which extends vertically down and communicates with the bottom of the compartment 36. A stack of inclined plates 69 are provided in the compartment 36 and, in use, water flows slowly up between the inclined plates allowing solids to settle. The wall 30 which divides the compartment 36 from the compartment 38 again has a cut-away portion (not clearly visible in the drawings) the bottom edge of which is below the level of the bottom edge of the cut-away portion 66, providing a water outlet from the compartment 36 and an inlet into the compartment 38. Towards the top of the compartment 38, there is a water outlet, again below the level of the inlet to the compartment 38, that leads via a monitoring zone to an outlet pipe 70 that extends downwardly along the outside of the recessed end wall of the container 10 to an outlet 72.

In each of the compartments 32, 34 and 38, there is provided both a mixing device and a gas introduction device, the devices being mounted on beams 76 extending across the container and including motors 78. Chemicals used during operation of the plant, as will be described below are provided in one of the storage spaces closed by one of the sets of double doors 42 and ancillary equipment such as control apparatus, sensors and one or more batteries are provided in the other of the storage spaces closed by the other set of double doors 42. It will be appreciated that the two storage areas provide a considerable amount of space in which such equipment and chemicals can be fitted. Cables and pipes are run from the storage spaces to the relevant parts of the upper region of the container along ducting 80 in the walkway 40.

It may be noted that the corner castings 20 together define a cuboidal space and that, when the lid 52 is closed, all the plant is contained within that cuboidal space.

In an example of use of the plant, the container is loaded onto a vehicle for transport to a construction site. The container 10 is lifted by load handling equipment of a common kind able to lift standard freight containers, with the load handling equipment engaging the four corner castings 20 at the top of the container 10. The container 10 is placed on a trailer suitable for carrying standard freight containers and with locking members able to engage the four corner castings at the bottom of the container 10. The container 10 is then transported on the trailer of the vehicle to the construction site and unloaded from the trailer by engaging the four corner castings at the top of the container.

Once placed in a desired position at a site, a supply of water to be treated is connected to the inlet 60. In this particular example the supply of water is from a hydro-demolition site and the water is strongly alkaline and laden with concrete solids. Water entering the inlet 60 passes into the compartment 32 and fills the compartment until it reaches the level of the bottom of the cut-away portion 64; thereafter as water enters the compartment 32, other water leaves the compartment and enters the compartment 34. Once there is water in the compartment 32, the mixer in that compartment is switched on and carbon dioxide is bubbled into the compartment near the bottom thereof, reducing the alkalinity of the water in the compartment. The carbon dioxide is supplied from a cylinder fitted in the cage 48. Electricity for powering the motor 78 that drives the mixer is supplied from a generator and both the operation of the motor and the feeding of the carbon dioxide is controlled by a control unit from those storage spaces. If desired a pH sensor may also be provided in the compartment 32 and its output fed to the control unit.

Water leaving the compartment 32 and entering the compartment 34 is treated in a similar way, with carbon dioxide being fed to that compartment too and the mixer for that compartment being driven by its respective motor 78.

If desired coagulant or flocculant stored in one of the storage spaces may be fed into one or both of the compartments 32, 34, with the supply being controlled by the control unit in the storage space.

Typically, the amount of carbon dioxide added in the compartments 32, 34 reduces the pH leaving the compartment 34 to between 10 and 11. At that pH, calcium carbonate is formed as a precipitate. Water with the precipitate flows out of the compartment 34 over the bottom of the cut-away portion 66 into the channel 68 and then flows upwardly between the stack of plates 69. As the water flows between the plates, precipitate collects on the plates and slides down to the bottom of the compartment 36 from where it can be removed through an outlet (not shown).

Water flows out of the compartment 36 into the compartment 38 where it is treated in a similar way to the treatment in compartments 32 and 34, with carbon dioxide being fed to that compartment too and the mixer for that compartment being driven by its respective motor 78. The pH is reduced to about 7 in the compartment 38.

Treated water leaves the top of the compartment 38 and leaves the container through the pipe 70 and the outlet 72. The water can then be recycled or discharged into the environment as appropriate.

During normal operation the lid 52 is closed but it may be opened to allow access to the various compartments for maintenance or other purposes, with the steps 50 and the walkway 40 facilitating access.

EXAMPLE EMBODIMENTS

Example 1 includes a mobile water treatment plant comprising a container within which at least the following are provided: a plurality of tanks, the plurality of tanks comprising a clarifying tank fitted with a multiplicity of inclined plates defining a multiplicity of channels there between, an upstream tank from which water is arranged to be fed to the clarifying tank and a downstream tank to which water is arranged to be fed from the clarifying tank; means for introducing a neutralising agent into water in the upstream tank; at least one storage space within the interior space of the container, said at least one storage space including space for accommodating the neutralising agent, wherein the container is of generally cuboidal shape having a length greater than its width and having sides, ends, a top and a bottom and has corner fittings placed at positions to allow the container to be engaged by standard load handling equipment for handling freight containers and the overall width of the container is substantially the same as the width of a standard freight container.

Example 2 includes a mobile water treatment plant according to Example 1, in which the centre to centre spacing of corner fittings on opposite sides of the container is about 2260 mm.

Example 3 includes a mobile water treatment plant according to Example 2, in which the overall length of the container is about 6 m.

Example 4 includes a mobile water treatment plant according to Example, in which the tanks are arranged along the length of the container and are spaced from a first side of the container, and a first storage space adjoins the first side of the container.

Example 5 includes a mobile water treatment plant according to Example 4, in which the tanks are arranged in a row along the length of the container with adjacent tanks sharing a common wall.

Example 6 includes a mobile water treatment plant according to Example 4 or 5, in which a walkway is defined along the top of the container above the first storage space.

Example 7 includes a mobile water treatment plant according to Example 6, in which the walkway extends along a first, major, part of the length of the container and steps leading from the bottom of the container to the walkway extend along a second, minor, part of the length of the container.

Example 8 includes a mobile water treatment plant according to Example 7, in which the first storage space is divided into two or more storage compartments arranged in a row along the length of the container.

Example 9 includes a mobile water treatment plant according to Example, in which the sides of the container are substantially closed but one or more doors are provided in at least one side to provide access to a storage space.

Example 10 includes a mobile water treatment plant according to Example, in which a storage space is provided at one end of the container.

Example 11 includes a mobile water treatment plant according to Example, further including, in said at least one storage space, at least one pump and at least one control unit that includes control means for controlling operation of the pump.

Example 12 includes a mobile water treatment plant according to Example in which the top of the container comprises a closure member that is movable between a closed and an open position, at least some of the tanks being accessible from above when the closure member is in an open position.

Example 13 includes a mobile water treatment plant according to Example 12, in which the closure member comprises a hinged lid.

Example 14 includes a mobile water treatment plant according to Example, in which the container comprises walls that are thermally insulated.

Example 15 includes a mobile water treatment plant according to Example 14, in which the walls are double skinned walls and thermal insulating material is provided between the skins.

Example 16 includes a mobile water treatment plant according to Example, in which a mixer is provided in the upstream tank for mixing the contents of the tank.

Example 17 includes a mobile water treatment plant according to Example, in which a gas introduction device is provided in the upstream tank for introducing gas into the upstream tank.

Example 18 includes a mobile water treatment plant according to Example, in which a further upstream tank is provided in the container, the water being arranged to be fed from the further upstream tank to the first-mentioned upstream tank.

Example 19 includes a mobile water treatment plant according to Example, in which an outlet for dispensing treated water is provided in a lower region of the container, the outlet being connected to receive water from an upper region of the downstream tank.

Example 20 includes a method of treating water, the method comprising the following steps: a) providing a mobile water treatment plant according to Example; b) transporting the plant to a site at which water is to be treated, with at least some of the fastening elements of the container being engaged by load handling equipment and/or a vehicle during the transport; c) feeding water to be treated to the upstream tank; d) supplying a neutralising agent to the upstream tank; and e) discharging treated water from the downstream tank.

Example 21 includes a method of manufacturing a mobile water treatment plant, the method comprising the steps of: a) providing a freight container with closed sides and ends; b) cutting openings in the freight container, adding internal walls to the container and adding other fittings to the container to provide a mobile water treatment plant according to any of Examples 1 to Example 19.

It will be understood that a variety of other arrangements may be employed, for example to treat other waste water. Whilst in the container described there are two compartments 32, 34 upstream of the stack of plates 69, an alternative would be to have a single compartment and/or to arrange the compartments in a different pattern. For other treatments, other chemicals may be stored in the storages space with access through the doors 42. Instead of using carbon dioxide as the neutralising agent, a liquid acid may, for example, be used and in that case the cage 48 may be omitted.

It will be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A mobile water treatment plant comprising a container within which at least the following are provided: a plurality of tanks, the plurality of tanks comprising a clarifying tank fitted with a multiplicity of inclined plates defining a multiplicity of channels there between, an upstream tank from which water is arranged to be fed to the clarifying tank by passing through an outlet in an upstream wall that divides the upstream tank from the clarifying tank and a downstream tank to which water is arranged to be fed from the clarifying tank by passing over outlet in of a downstream wall that divides the clarifying tank from the downstream tank; means for introducing a neutralizing agent into water in the upstream tank; means for introducing a neutralizing agent into water in the downstream tank; at least one storage space within the interior space of the container, said at least one storage space including space for accommodating the neutralizing agent, wherein the container is of generally cuboidal shape having a length greater than its width and having sides, ends, a top and a bottom and has corner fittings placed at positions to allow the container to be engaged by standard load handling equipment for handling freight containers and the overall width of the container is substantially the same as the width of a standard freight container and wherein the upstream wall extends upwardly but has a cut-away portion that defines the outlet in the upstream wall; and the downstream wall extends upwardly but has a cut-away portion that defines the outlet in the downstream wall; and a bottom edge of the cut-away portion of the downstream wall is below the level of a bottom edge of the cut-away portion of the upstream wall.

2. A mobile water treatment plant according to claim 1, in which the center to center spacing of corner fittings on opposite sides of the container is about 2260 mm.

3. A mobile water treatment plant according to claim 2, in which the overall length of the container is about 6 m.

4. A mobile water treatment plant according to claim 1, in which the tanks are arranged along the length of the container and are spaced from a first side of the container, and a first storage space of the at least one storage space adjoins the first side of the container.

5. A mobile water treatment plant according to claim 4, in which the tanks are arranged in a row along the length of the container with adjacent tanks sharing a common wall.

6. A mobile water treatment plant according to claim 4, in which the first storage space is divided into two or more storage compartments arranged in a row along the length of the container.

7. A mobile water treatment plant according to claim 1, in which the sides of the container are substantially closed but one or more doors are provided in at least one side to provide access to the at least one storage space.

8. A mobile water treatment plant according to claim 1, in which the at least one storage space is provided at one end of the container.

9. A mobile water treatment plant according to claim 1, further including, in said at least one storage space, at least one pump and at least one control unit that includes control means for controlling operation of the pump.

10. A mobile water treatment plant according to claim 1, in which the top of the container comprises a closure member that is movable between a closed and an open position, at least some of the tanks being accessible from above when the closure member is in an open position.

11. A mobile water treatment plant according to claim 10, in which the closure member comprises a hinged lid.

12. A mobile water treatment plant according to claim 1, in which the container comprises walls that are thermally insulated.

13. A mobile water treatment plant according to claim 1, in which a mixer is provided in the upstream tank for mixing the contents of the tank.

14. A mobile water treatment plant according to claim 1, in which a gas introduction device is provided in the upstream tank for introducing gas into the upstream tank.

15. A mobile water treatment plant according to claim 1, in which a further upstream tank is provided in the container, the water being arranged to be fed from the further upstream tank to the first-mentioned upstream tank.

16. A mobile water treatment plant according to claim 1, in which an outlet for dispensing treated water is provided in a lower region of the container, the outlet being connected to receive water from an upper region of the downstream tank.

17. A method of treating water, the method comprising:
a) providing a mobile water treatment plant comprising a container within which at least the following are provided: a plurality of tanks, the plurality of tanks comprising a clarifying tank fitted with a multiplicity of inclined plates defining a multiplicity of channels there between, an upstream tank from which water is arranged to be fed to the clarifying tank by passing over an upper edge of an upstream wall that divides the upstream tank from the clarifying tank and a downstream tank to which water is arranged to be fed from the clarifying tank by passing over an upper edge of a downstream wall that divides the clarifying tank from the downstream tank; means for introducing a neutralizing agent into water in the upstream tank; means for introducing a neutralizing agent into water in the downstream tank; at least one storage space within the interior space of the container, said at least one storage space including space for accommodating the neutralizing agent, wherein the container is of generally cuboidal shape having a length greater than its width and having sides, ends, a top and a bottom and has corner fittings placed at positions to allow the container to be engaged by standard load handling equipment for handling freight containers and the overall width of the container is substantially the same as the width of a standard freight container and wherein the upper edge of the downstream wall is a bottom edge of a cut-away portion of the downstream wall and the upper edge of the upstream wall is a bottom edge of a cut-away portion of the upstream wall and the upper edge of the downstream wall is at a lower level than the upper edge of the upstream wall;
b) transporting the plant to a site at which water is to be treated, with at least some of the corner fittings of the container being engaged by load handling equipment and/or a vehicle during the transport;
c) feeding water to be treated to the upstream tank;
d) supplying a neutralizing agent to the upstream tank; and
e) discharging treated water from the downstream tank.

18. A mobile water treatment plant comprising a container within which at least the following are provided: a plurality of tanks, the plurality of tanks comprising a clarifying tank fitted with a multiplicity of inclined plates defining a multiplicity of channels there between, an upstream tank from which water is arranged to be fed to the clarifying tank and a downstream tank to which water is arranged to be fed from the clarifying tank; means for introducing a neutralizing agent into water in the upstream tank; means for introducing a neutralising agent into water in the downstream tank; at least one storage space within the interior space of the container, said at least one storage space including space for accommodating the neutralizing agent, wherein the container is of generally cuboidal shape having a length greater than its width and having sides, ends, a top and a bottom and has corner fittings placed at positions to allow the container to be engaged by standard load handling equipment for handling freight containers and the overall width of the container is substantially the same as the width of a standard freight container and
wherein an open-topped recess, accessible from the end of the container defines a walkway along the top of the container above the at least one storage space.

19. A mobile water treatment plant according to claim 18, in which the walkway extends along a first, major, part of the length of the container and steps leading from the bottom of the container to the walkway extend along a second, minor, part of the length of the container.

20. A mobile water treatment plant according to claim 18, further comprising steps to provide access to a user from the ground to the walkway, the steps having a longitudinal axis that is substantially parallel to a longitudinal axis of the walkway.

21. A mobile water treatment plant according to claim 18, wherein one of the sides of the container defines, at least in part, the open-topped recess.

* * * * *